United States Patent [19]
Nemoto

[11] Patent Number: 6,097,735
[45] Date of Patent: Aug. 1, 2000

[54] SIGNAL PROCESSING APPARATUS CAPABLE OF PROCESSING RECEIVED SIGNALS OF DIFFERENT BIT RATES

[75] Inventor: Nobuyuki Nemoto, Kawasaki, Japan

[73] Assignee: Fujitsu Limited, Kanagawa, Japan

[21] Appl. No.: 08/919,675

[22] Filed: Aug. 28, 1997

[30] Foreign Application Priority Data

Mar. 17, 1997 [JP] Japan .................................. 9-063352

[51] Int. Cl.[7] ................................. H04J 3/06; H04J 3/22
[52] U.S. Cl. ...................... 370/476; 370/509; 370/543; 341/100; 714/800; 375/354
[58] Field of Search .................................. 370/366, 321, 370/506, 516, 517, 535, 536, 537, 542, 476, 465, 468, 509, 368, 543; 395/891; 341/100, 101, 61, 67, 94; 375/354, 355, 359; 714/800; 710/62, 65, 71

[56] References Cited

U.S. PATENT DOCUMENTS

| | | | |
|---|---|---|---|
| 5,715,248 | 2/1998 | Lagle, III et al. ....................... | 370/366 |
| 5,729,227 | 3/1998 | Park ......................................... | 341/100 |
| 5,808,571 | 9/1998 | Kuwata et al. .......................... | 341/100 |
| 5,946,327 | 8/1999 | Murphy ................................... | 370/517 |
| 6,018,305 | 1/2000 | Kikuchi et al. ......................... | 341/100 |

Primary Examiner—Seema S. Rao
Attorney, Agent, or Firm—Helfgott & Karas, P.C.

[57] ABSTRACT

In a signal processing circuit capable of handling different signal rates, an STS-3 signal input as 78 M×2 parallel signals is converted by a serial-to-parallel converter into 19 M×8 parallel signals, thus making the number of signal lines equal to that of an STS-12 signal input as 78 M×8 parallel signals. Depending on whether the mode is STS-12 mode or STS-3 mode, a first selector selects the 78 M×8 parallel signals of STS-12 or the 19 M×8 parallel signals of STS-3, and supplies the selected signals to a signal processor. Depending on whether the mode is STS-12 mode or STS-3 mode, a second selector selects a 78-M clock or a 19-M clock and supplies the selected clock to the signal processor.

5 Claims, 17 Drawing Sheets

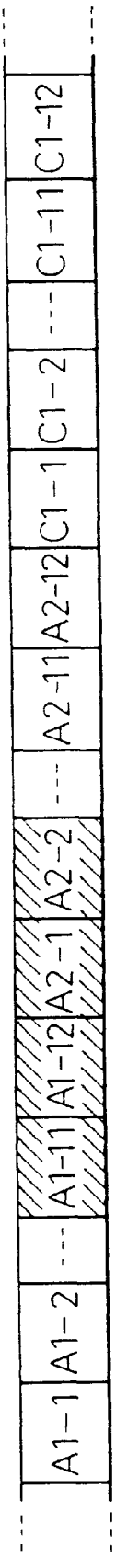
Fig.6

Fig.7
1ST PATTERN
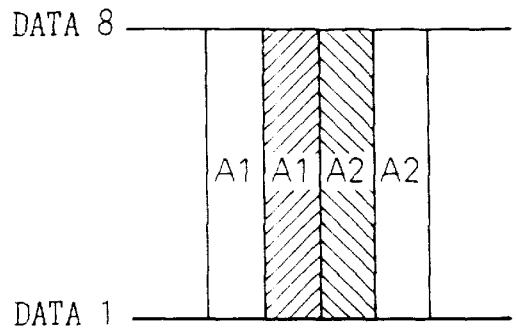
2ND PATTERN
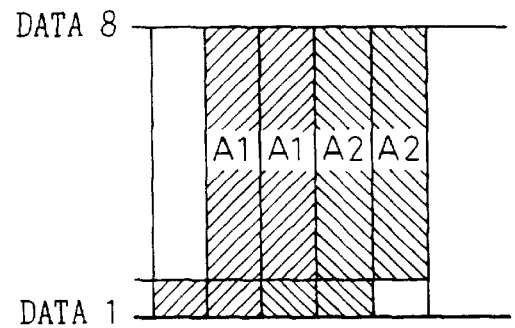
3RD PATTERN
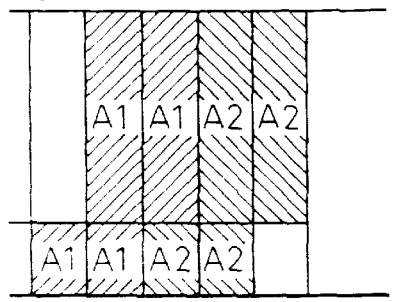
4TH PATTERN
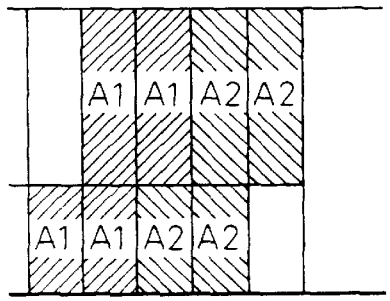
5TH PATTERN
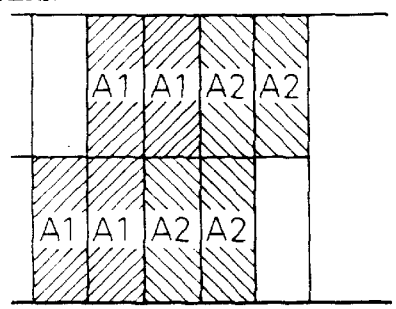
6TH PATTERN
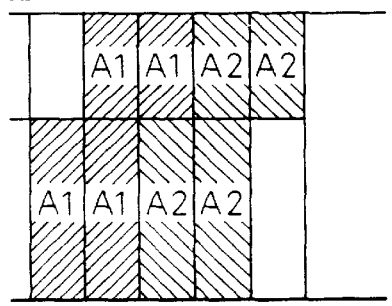
7TH PATTERN
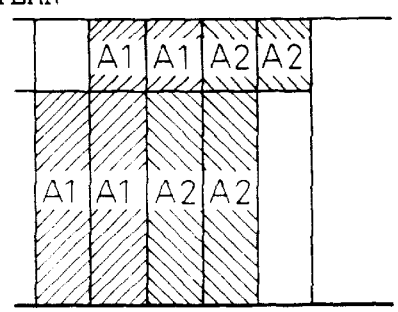
8TH PATTERN
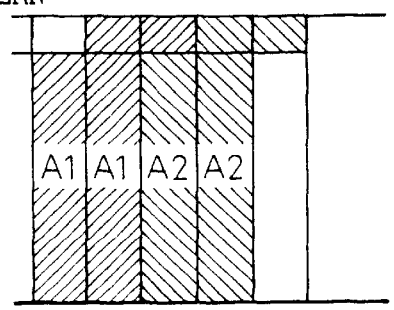

Fig.13
1ST PATTERN
DATA 32
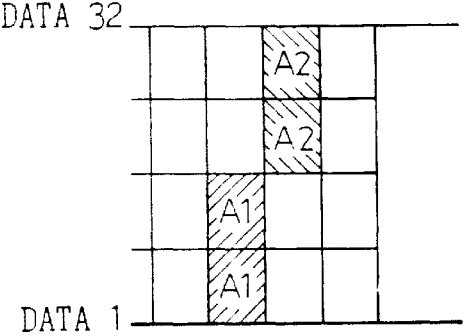
DATA 1
2ND PATTERN
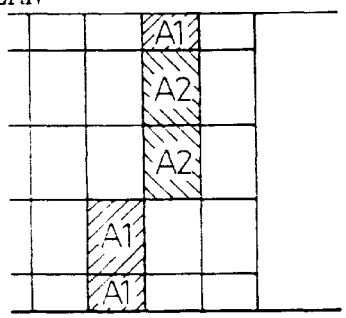
3RD PATTERN
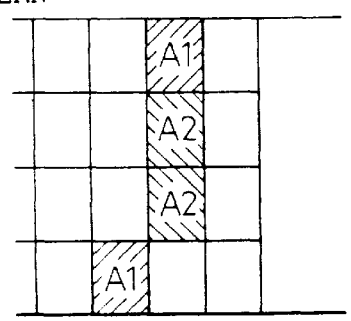
30TH PATTERN
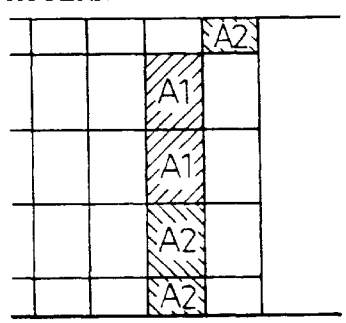
31ST PATTERN
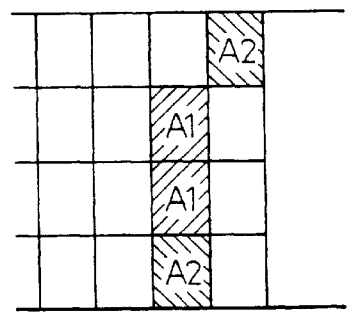
32ND PATTERN
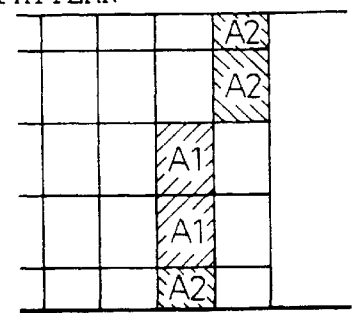

SIGNAL PROCESSING APPARATUS CAPABLE OF PROCESSING RECEIVED SIGNALS OF DIFFERENT BIT RATES

BACKGROUND OF THE INVENTION

1. Field of the Invention

The present invention relates to a signal processing unit that performs frame synchronization and other signal processing on a received signal after reducing the signal speed to a manageable speed for complex signal processing by converting the received signal into parallel signals on the necessary number of signal lines, the signal processing unit being incorporated in a transmission apparatus used in a transmission system for which a frame structure providing a transmission capacity N times that of a base-level frame is defined in a form such that N base-level frames are interleaved, as specified by SONET (Synchronous Optical Network) and SDH (Synchronous Digital Hierarchy).

2. Description of the Related Art

The aforementioned transmission apparatus can have a different capacity, in terms of the amount of information it can handle, according to the purpose of the information transmission. In the case of SONET, for example, a commercially available transmission apparatus can have one of several capacities starting with Synchronous Transport Signal Level 1 (STS-1 signal) (51.84-Mb/s bit rate) and extending to STS-3 and STS-12, and today, STS-48 (2.4-Gb/s bit rate). In the future, the need for the transmission of every possible kinds of information, including video, is expected to increase, demanding a corresponding increase in the transmission capacity of the transmission apparatus, and work is now underway to develop transmission apparatus capable of STS-192 (10-Gb/s bit rate). Here, STS-N (N is 3, 12, 48, and 192) has a frame structure defined in a form such that N base-level STS-1s are byte-interleaved.

In a transmission apparatus handling such high-speed signals, signal processing, including frame synchronization, is performed on a received optical signal after reducing the signal speed to a manageable speed (for example, 78 MHz, and more precisely 77.76 MHz) for complex signal processing by first converting the received optical signal into an electrical signal and then serial-parallel converting it into parallel signals on the necessary number of signal lines. For example, in the case of an STS-3 signal, the signal is converted into 78 MHz×2 parallel signals; likewise, the received signal is converted into 78 MHz×8 parallel signals in the case of an STS-12 signal, and into 78 MHz×32 parallel signals in the case of an STS-48 signal. The parallel signals are then input to an LSI for frame synchronization and other signal processing.

Traditionally, a transmission apparatus was limited to, for example, either STS-3 or STS-12, and the gate size of a signal processing LSI was not as large as that of present ones; as a result, there was no need to process signals at different bit rates using the same LSI, and the design of a transmission apparatus was based on single bit rate. However, with an increase in an information transmission rate, the problem has arisen that with the present signal processing unit capable of handling only a single bit rate, the unit has to be replaced as the amount of information increases, and an LSI has to be developed to handle the increased bit rate. This is quite uneconomical in view of the time and cost required to develop one LSI.

One solution would be to simply provide two different signal processing circuits to handle signals of different bit rates, but this would increase the LSI gate size unnecessarily, resulting in an enormously inefficient system (in terms of power consumption, cost, etc.).

SUMMARY OF THE INVENTION

Accordingly, it is an object of the present invention to provide a signal processing apparatus whose circuitry is reduced by configuring it to be able to process signals of different bit rates using a common processing circuit.

According to the present invention, there is provided a signal processing apparatus to which first parallel received signals of a prescribed speed, or second parallel received signals whose speed is the same as the first received signal and whose number of signal lines are 1/n times that of the first received signals, are input, comprising: a serial-to-parallel conversion circuit for converting the second received signals into parallel signals whose number of signal lines is the same as that of the first received signals and whose speed is 1/n times that of the first received signals; a first selector for taking as inputs the first received signals and the outputs of the serial-to-parallel conversion circuit, and for selecting one or the other of the inputs; a second selector for taking as inputs a first clock signal of the prescribed speed and a second clock signal whose speed is 1/n times the first clock signal, and for selecting the first clock signal when the first received signals are selected by the first selector, and the second clock signal when the outputs of the serial-to-parallel conversion circuit are selected by the first selector; and a signal processor for processing the parallel signals selected by the first selector, in synchronism with the clock signal selected by the second selector.

BRIEF DESCRIPTION OF THE DRAWINGS

FIG. 6 is a diagram for explaining how synchronization detection can be achieved using a common circuit;

FIG. 7 is a diagram showing eight synchronization detection patterns;

FIG. 13 is a diagram showing 32 synchronization detection patterns;

DESCRIPTION OF THE PREFERRED EMBODIMENTS

Figure 1:
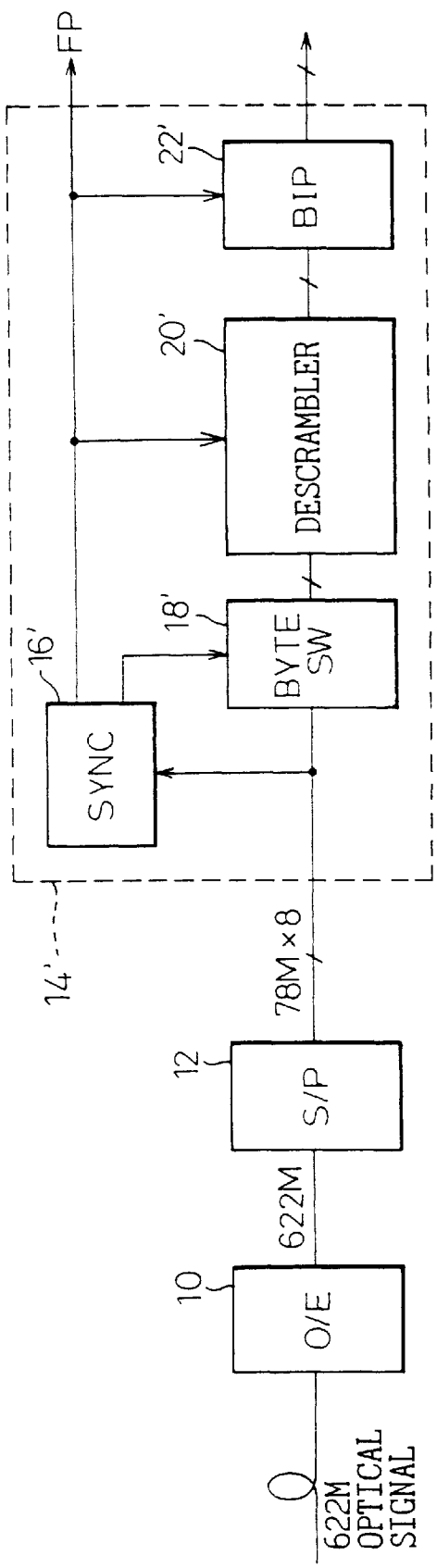
FIG. 1 is a block diagram showing the configuration of a transmission apparatus according to the prior art.

FIG. 1 shows the configuration of a synchronous optical transmission apparatus for receiving a 622-Mb/s STS-12 optical signal, as an example of the prior art transmission apparatus. In FIG. 1, the 622-Mb/s STS-12 optical signal is converted by an optical-to-electrical converter 10 into an electrical signal, which, before being input to a signal processing LSI 14', is converted by a serial-to-parallel converter 12 into parallel signals (78 MHz×8 parallel signals) on eight signal lines each operating at 78 MHz at which the LSI can easily operate. The signal processing LSI 14' includes, for example, a synchronization circuit 16' for performing frame synchronization by detecting synchronization bytes (A1 and A2 bytes) carried in an STS-12 frame, a byte switch 18' for rearranging the signal positions of the parallel signals into correct positions in accordance with the synchronization information output from the synchronization circuit 16', a descrambler 20' for unlacing the scrambling applied to prevent 0s or 1s from appearing in succession along the transmission line, and a Line BIP-8 check circuit 22' for performing a Line BIP-8 parity check using the B2 byte.

In the transmission apparatus designed for STS-12 at 622 Mb/s, the signal is converted by the serial-to-parallel converter 12 into 78 MHz×8 parallel signals for input to the signal processing LSI, as shown in FIG. 1; on the other hand, in the case of STS-3 at 155 Mb/s, the signal is converted into 78 MHz×2 parallel signals for input to the signal processing LSI. Accordingly, when changing the signal rate from STS-3 to STS-12, the prior art requires either replacing the LSI itself or incorporating two circuits, one for STS-3 and the other for STS-12, into the signal processing LSI 14'.

Figure 2:
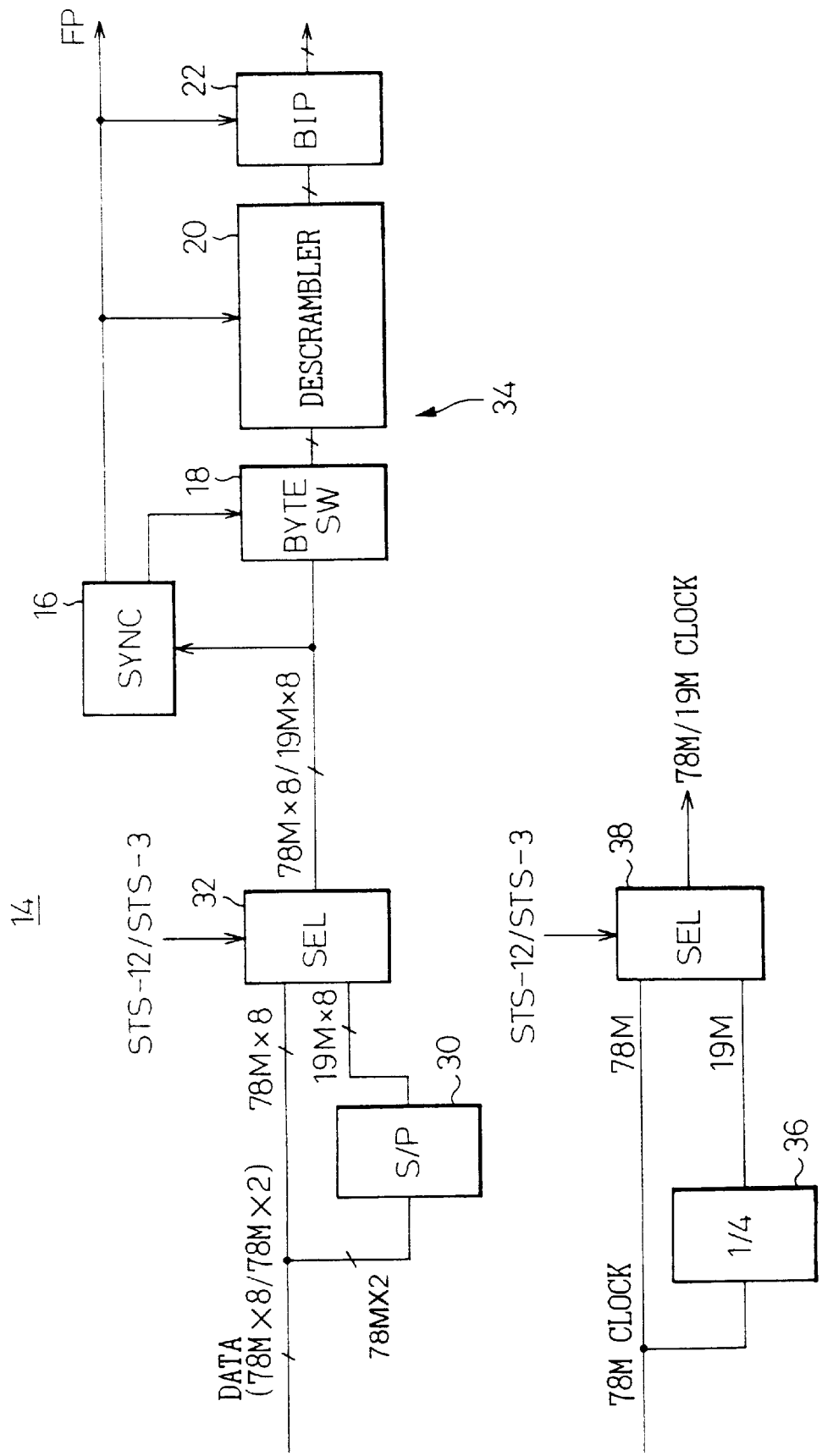
FIG. 2 is a block diagram showing the configuration of a signal processing LSI according to a first embodiment of the present invention.

FIG. 2 shows the configuration of a signal processing LSI 14 according to one embodiment of the present invention. A serial-to-parallel converter 30 converts 78 M×2 parallel signals on the two data input lines used for the input of STS-3, out of eight data input lines, into 19 M×8 parallel signals for output. A selector 32 selects 78 M×8 parallel signals on the eight data input lines for output when the LSI 14 is set in the STS-12 mode, and selects the 19 M×8 parallel signals from the serial-to-parallel converter 30 for output when the LSI 14 is set in the STS-3 mode. The 78 M×8 parallel signals or 19 M×8 parallel signals output from the selector 32 are input to a signal processor 34 which includes a synchronization circuit 16, a byte switch 18, a descrambler 20, and a Line BIP-8 check circuit 22.

On the other hand, a divide-by-4 frequency divider 36 divides a 78-M clock by 4 to derive a 19-M clock for output. A selector 38 selects the 78-M clock when the LSI 14 is set in the STS-12 mode, and the 19-M clock when it is set in the STS-3 mode. The clock selected by the selector 38 is supplied to the necessary portions of the signal processor 34. As an alternative, both the 78-M and 19-M clocks may be supplied to the signal processor 34, in which case a selector for selecting the clock appropriate to the currently set mode is placed at each of the necessary portions.

In this way, whether in the STS-3 mode or in the STS-12 mode, the data are supplied as eight parallel signals to the signal processor 34 together with the clock that matches the data speed, so that most of the circuitry of the signal processor 34 can be shared between STS-3 and STS-12, as will be described below.

Figure 3:
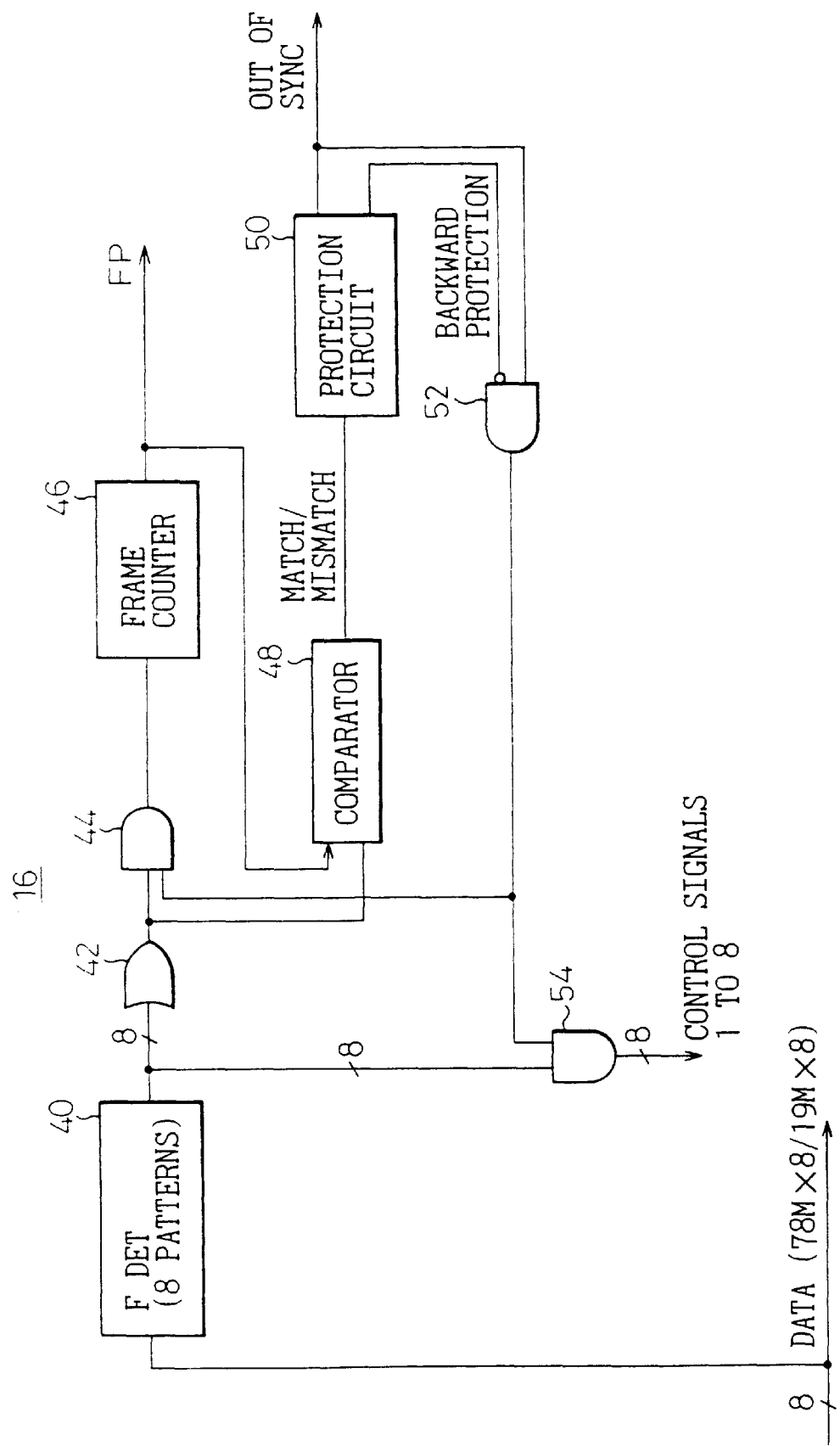
FIG. 3 is a circuit diagram showing the details of a synchronization circuit 16 shown in FIG. 2.
Figure 4:
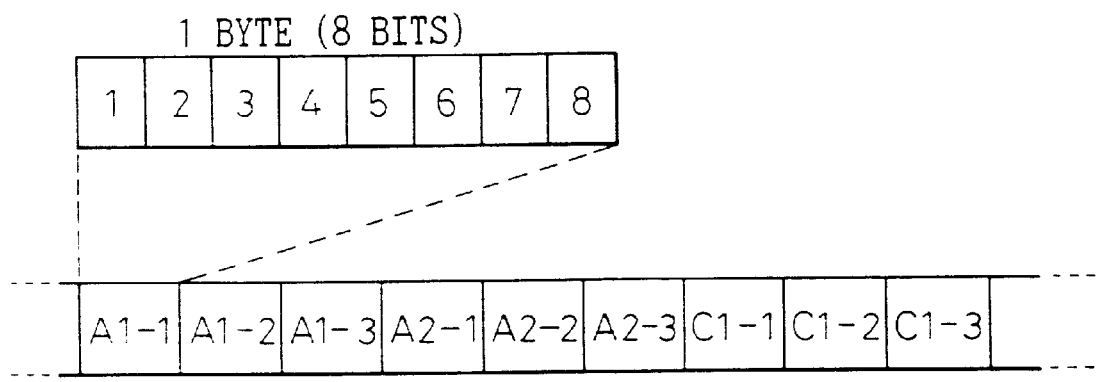
FIG. 4 is a diagram showing synchronization bytes within an STS-3 signal.
Figure 5:
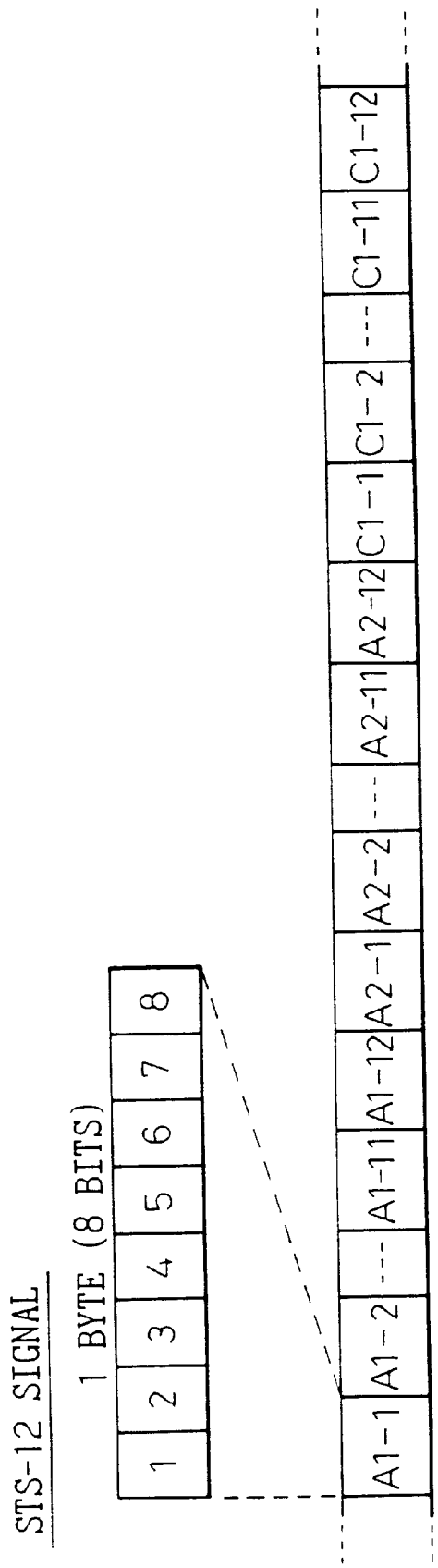
FIG. 5 is a diagram showing synchronization bytes within an STS-12 signal.

FIG. 3 shows a detailed configuration of the synchronization circuit 16 incorporated in the signal processor 34 of FIG. 2. With the STS-3 signal, three A1 bytes (24 bits) appear consecutively, followed by three A2 bytes, which are used for frame synchronization (see FIG. 4). With the STS-12 signal, 12 A1 bytes appear consecutively, followed by 12 A2 bytes (see FIG. 5). Accordingly, if provisions are made to detect, for example, four bytes across the A1/A2 boundary, as indicated by oblique hatching in FIG. 6, then it is possible to detect synchronization using a common circuit whether in the STS-3 mode or in the STS-12 mode. Since the serial-to-parallel conversion in the serial-to-parallel converters 12 (FIG. 1) and 30 (FIG. 2) is not synchronized to byte boundaries appearing at every eight bits, the above-mentioned four bytes can appear on the eight signal lines of data 1 to data 8 in eight different ways as shown by the first pattern to the eighth pattern in FIG. 7. Therefore, the synchronization detector 40 shown in FIG. 3 contains the eight patterns shown in FIG. 7 which are simultaneously compared with the input signal.

If the input signal matches one of the eight patterns, the output of an OR gate 42 goes active, and since the initial state is asynchronous, the output of an AND gate 44 also goes active, causing a frame counter 46 to be loaded with a value representing the number of clocks during one frame period. In a comparator circuit 48, the frame timing position that the frame counter 46 outputs is compared with the frame timing position that the synchronization detector 40 outputs, and the result of the comparison is supplied to a protection circuit 50.

The protection circuit 50 performs the protection function defined by the SONET standard. More specifically, the function of this circuit is to provide protection by checking the detected pattern two or three times to prevent synchronization from being achieved or from being lost with a slight bit error. The internal working of the protection circuit is as follows.

SONET requires the provision of a protection function in synchronization detection, which is classified into forward protection and backward protection.

Forward protection, n stages: A forward counter counts up from the first frame-pattern non-detection to the n-th frame-pattern non-detection, and an out-of-synchronization condition is declared when the count reaches the n-th non-detection.

Backward protection, m stages: A backward counter counts up from the first frame-pattern detection to the m-th frame-pattern detection, and a synchronized condition is declared when the count reaches the m-th detection.

A signal indicating an out-of-synchronization condition and a signal indicating a backward protection period, output from the protection circuit 50, are returned to one input of the AND circuit 44 via a gate 52. As a result, during the period when the synchronization is established, and during the forward protection and backward protection periods, the loading of the frame counter 46 is prohibited, and during any other period, that is, during the period between the initial condition or the declaration of an out-of-synchronization condition and the beginning of the backward protection period, the loading of the frame counter 46 is allowed.

The protection circuit is a circuit which counts detection or non-detection events occurring in the synchronization detector and which provides protection by preventing switching between synchronized and out-of-synchronization conditions from occurring with a single detection or non-detection event. The circuit therefore can operate with a preset number of stages (for example, two backward stages and four forward stages), independently of the number of levels of multiplexing.

In this way, the same synchronization detector can be used for both the STS-3 and STS-12 signals despite the difference in signal rate. This is advantageous in terms of circuit size, power consumption, etc.

During the period when the loading of the frame counter 46 is allowed, control signals, 1 to 8, indicating which pattern has matched, are supplied from the synchronization detector 40 to the byte switch via an AND gate 54.

Figure 8:
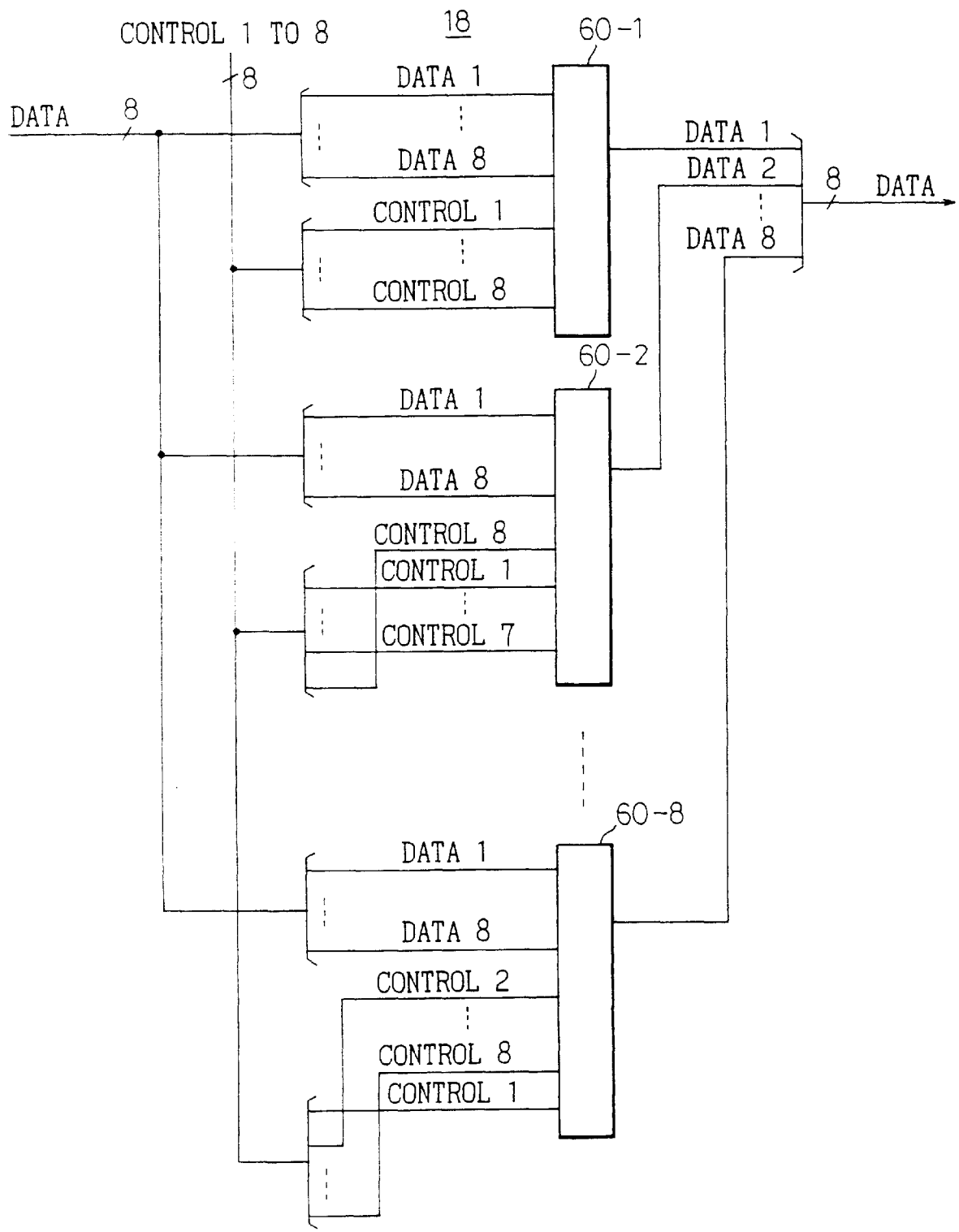
FIG. 8 is a circuit diagram showing the details of a byte switch 18 shown in FIG. 2.

FIG. 8 shows the details of the byte switch 18 of FIG. 2. The input data lines 1 to 8 are connected in parallel to selectors 60-1 to 60-8. The control lines 1 to 8 also are connected to all the selectors, but in different orders. The outputs of the selectors 60-1 to 60-8 are connected to the output data lines 1 to 8, respectively.

During the period when the loading of the frame counter 46 is allowed, if the first pattern of FIG. 7 is detected, a pulse is output on the control line 1. This causes the selector 60-1 to select the input data line 1 for connection to the output data line 1, the selector 60-2 to select the input data line 2 for connection to the output data line 2, and the selector 60-8 to select the input data line 8 for connection to the output data line 8. In this case, the signal positions of the parallel signals are not changed. If the second pattern of FIG. 7 is detected, a pulse 2 is output on the control line 2. This causes the selector 60-1 to select the input data line 2 for connection to the output data line 1, the selector 60-2 to select the input data line 3 for connection to the output data line 2, and the selector 60-8 to select the input data line 1 for connection to the output data line 8. In this case, the data on the output data line 8 is delayed by one clock by a delay circuit not shown. In this way, the one-byte data is correctly placed on the eight signal lines. If the eighth pattern of FIG. 7 is detected, a pulse is output on the control line 8. This causes the selector 60-1 to select the input data line 8 for connection to the output data line 1, the selector 60-2 to select the input data line 1 for connection to the output data line 2, and the selector 60-8 to select the input data line 7 for connection to the output data line 8. In this case, the data on the output data lines 2 to 8 are delayed by one clock by the delay circuit not shown. In this way, the one-byte data is correctly placed on the eight signal lines.

In this way, by making the number of parallel signals equal between the STS-3 and STS-12 signals using the serial-to-parallel converter 30 (FIG. 2) at the front end, the same byte switch can be used for both the STS-3 and STS-12 signals despite the difference in signal rate. This is advantageous in terms of circuit size, power consumption, etc.

Figure 9:
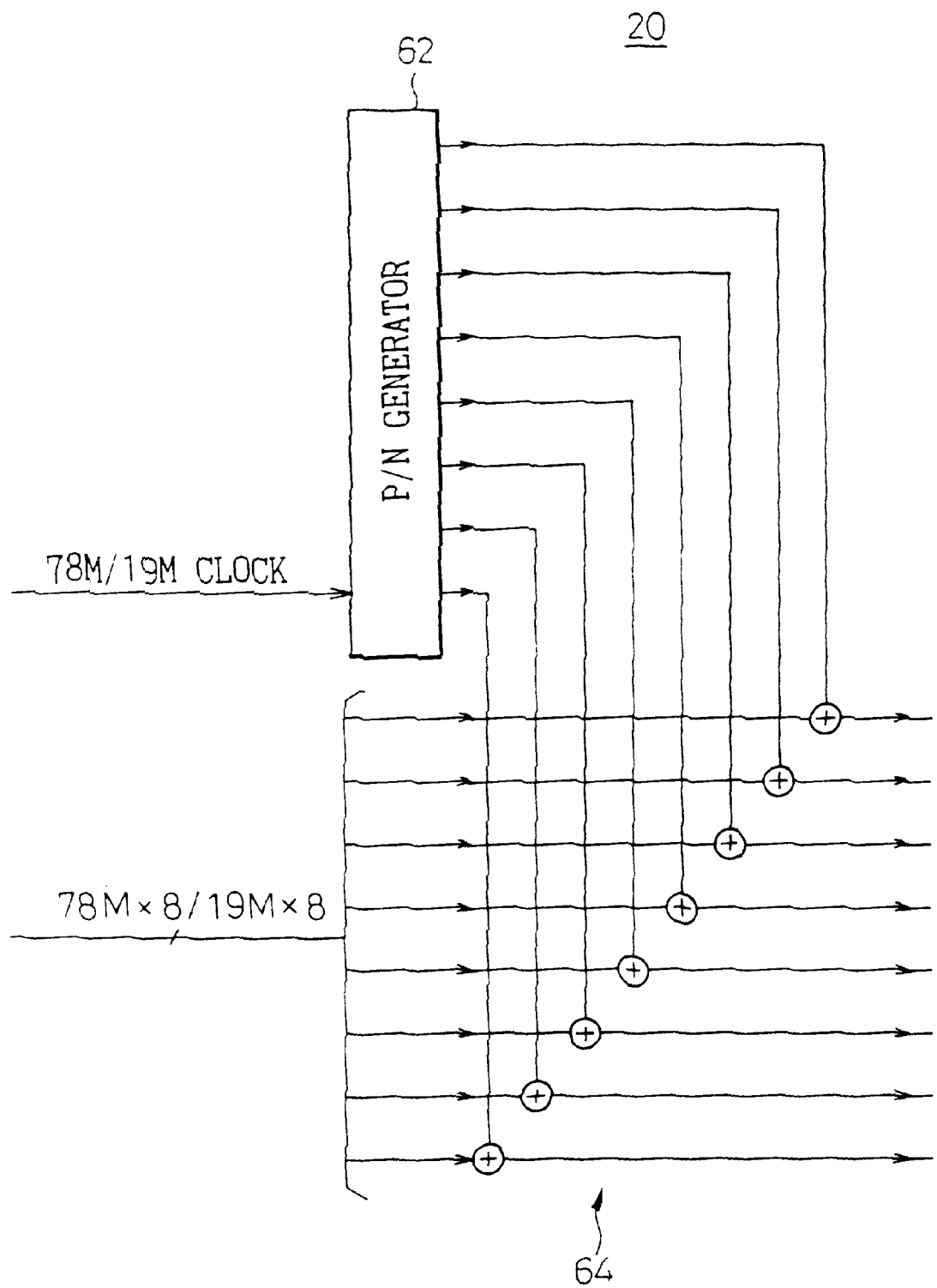
FIG. 9 is a circuit diagram showing the details of a descrambler 20 shown in FIG. 2.

FIG. 9 shows a detailed configuration of the descrambler 20 of FIG. 2. To a PN generator 62, the 19-M clock is supplied in the STS-3 mode, and the 78-M clock in the STS-12 mode. Based on the supplied clock, the PN generator 62 generates a pseudo-noise (PN) code of eight parallel bits. An EOR circuit 64 EORs the PN code with the 19 M×8 parallel data streams in the STS-3 mode and with the 78 M×8 parallel data streams in the STS-12 mode, to accomplish descrambling.

In this way, by making the number of parallel signals equal between the STS-3 and STS-12 signals using the serial-to-parallel converter 30 (FIG. 2) at the front end, the same descrambler can be used for both the STS-3 and STS-12 signals despite the difference in signal rate. This is advantageous in terms of circuit size, power consumption, etc.

Figure 10:
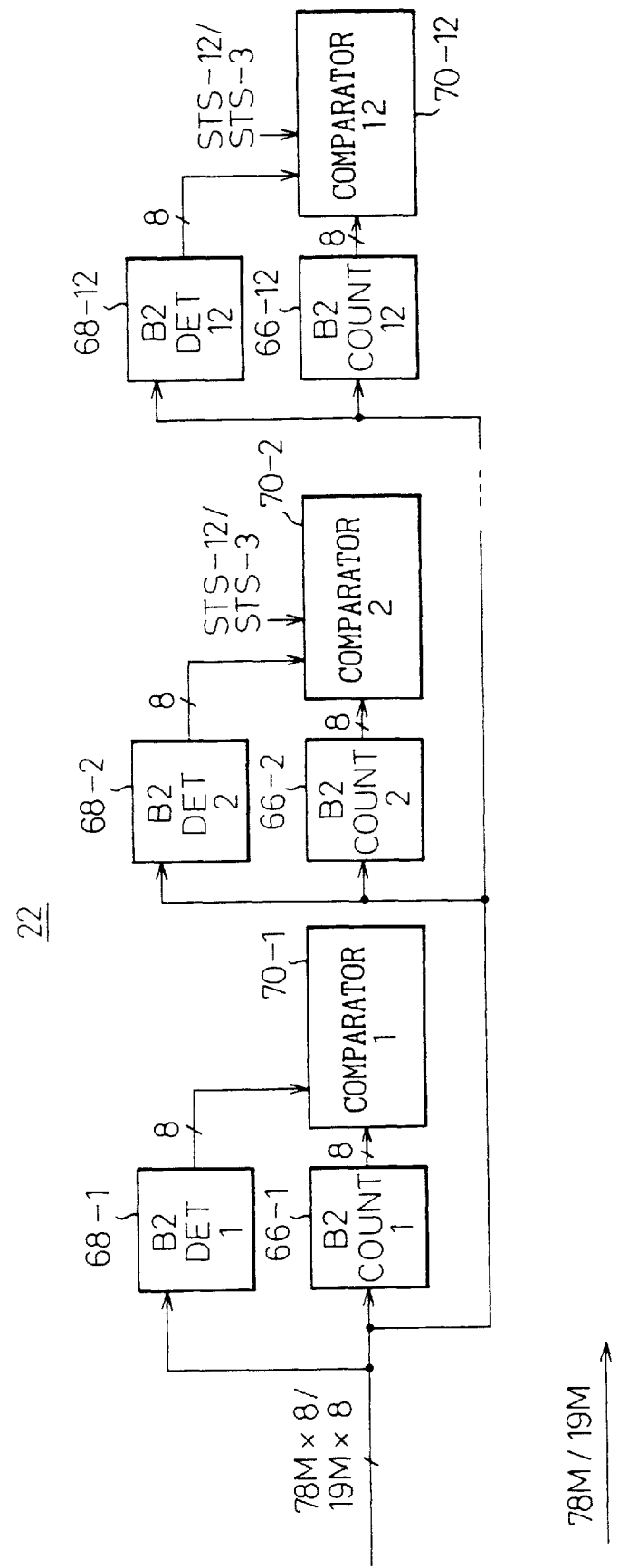
FIG. 10 is a circuit diagram showing the details of a Line BIP-8 check circuit 22 shown in FIG. 2.

FIG. 10 shows a detailed configuration of the Line BIP-8 check circuit 22 of FIG. 2.

In the case of the STS-12 signal, 12 B2 bytes are carried in one frame. First, the 78 M×8 parallel data streams are input to each of B2 counters 66-1 to 66-12, which count the parity between frame pulses detected by the synchronization detector and supply the results to comparators 70-1 to 70-12, respectively. On the other hand, B2 detectors 68-1 to 68-12 extract the B2 bytes from the received data (more precisely, the B2 bytes in the frame immediately succeeding the frame counted by the B2 counters), and supply them to the comparators 70-1 to 70-12, respectively. The parity check is performed by comparing both values.

In the case of the STS-3 signal, since three B2 bytes are carried in one frame, the parity check is performed by using the B2 detectors 68-1, 68-5, and 68-9, the B2 counters 66-1, 66-5, and 66-9, and the comparators 70-1, 70-5, and 70-9 in FIG. 10. First, the 19 M×8 parallel data streams are input to each of the B2 counters 66-1, 66-5, and 66-9, which count the parity between frame pulses detected by the synchronization detector and supply the results to the comparators 70-1, 70-5, and 70-9, respectively. On the other hand, the B2 detectors 68-1, 68-5, and 68-9 extract the B2 bytes from the received data, and supply them to the comparators 70-1, 70-5, and 70-9, respectively. The parity check is performed by comparing both values. Since the results of the comparisons from only the comparators labelled 1, 5, and 9 are used, the STS-3/STS-12 switching is controlled in such a manner as to inhibit the outputs of the other comparators.

In this way, by making the number of parallel signals equal between the STS-3 and STS-12 signals using the serial-to-parallel converter 30 (FIG. 2) at the front end, the same parity checking circuit can be used for both the STS-3 and STS-12 signals despite the difference in signal rate. This is advantageous in terms of circuit size, power consumption, etc.

Figure 11:
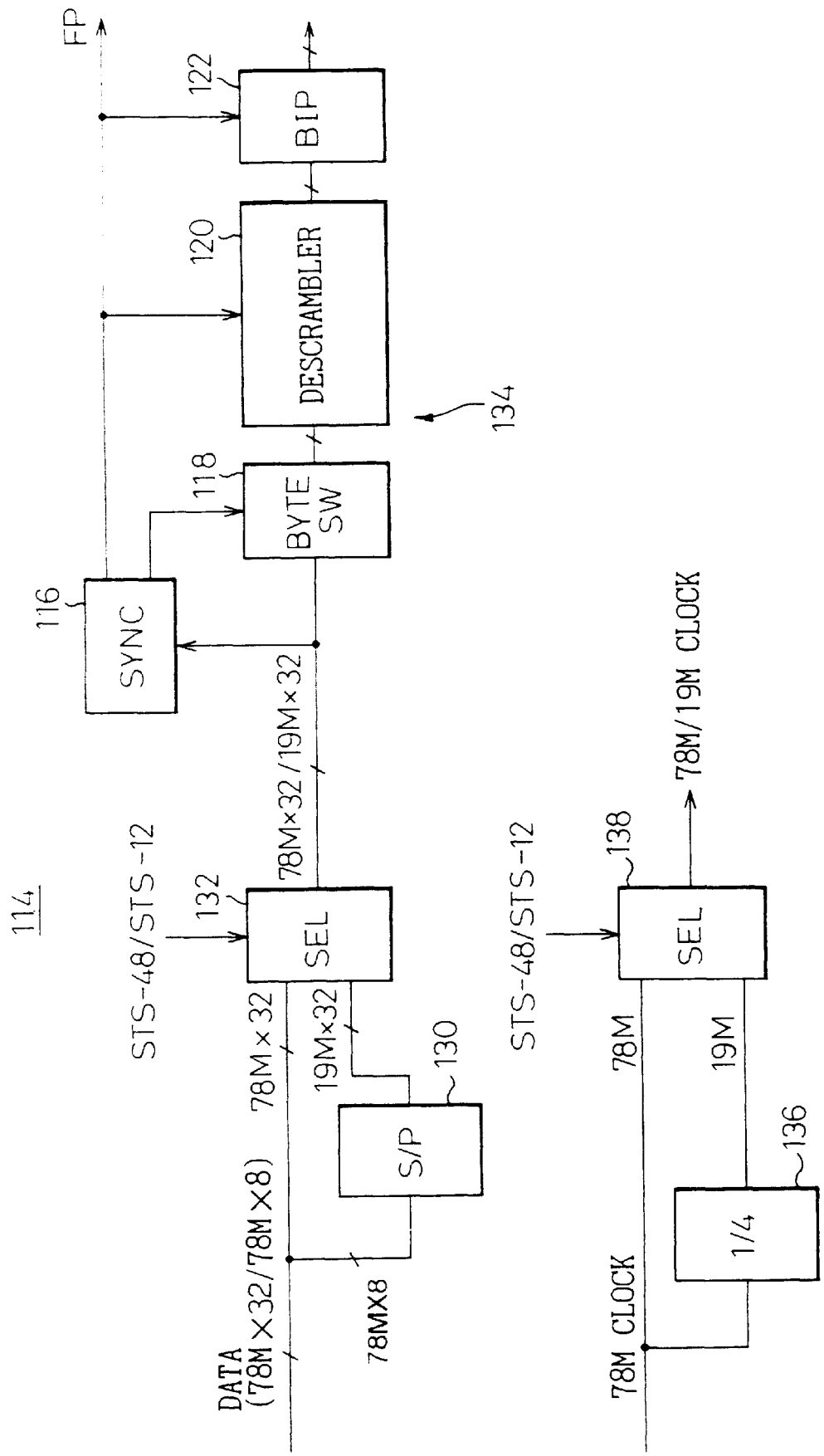
FIG. 11 is a block diagram showing the configuration of a signal processing LSI according to a second embodiment of the present invention.

FIG. 11 shows the configuration of a signal processing LSI 114 according to the present invention, capable of processing both the STS-48 and STS-12 signals. The STS-48 signal is input as 78 M×32 parallel signals to the signal processing LSI, while the STS-12 signal is input as 78 M×8 parallel signals. The frequency of 78 M is adopted here for the following reasons. At the present state of device technology, 78 M is the highest frequency at which complex signal processing can be done easily, and also, processing the STS-48 signal at 78 M means 32 parallel signals, the largest number of parallel signals feasible in actual manufacturing.

In FIG. 11, a serial-to-parallel converter 130 converts the 78 M×8 parallel signals on the eight data input lines used for the input of the STS-12 signal, out of the 32 data input lines, into 19 M×32 parallel signals for output. A selector 132 selects the 78 M×32 parallel signals on the 32 data input lines for output when the LSI 114 is set in the STS-48 mode, and selects the 19 M×32 parallel signals from the serial-to-parallel converter 130 for output when the LSI 114 is set in the STS-12 mode. The 78 M×32 parallel signals or 19 M×32 parallel signals output from the selector 132 are input to a signal processor 134 which includes a synchronization circuit 116, a byte switch 118, a descrambler 120, and a Line BIP-8 check circuit 122.

On the other hand, a divide-by-4 frequency divider 136 divides the 78-M clock by 4 to derive a 19-M clock for output. A selector 138 selects the 78-M clock when the LSI 114 is set in the STS-48 mode, and the 19-M clock when it is set in the STS-12 mode. The clock selected by the selector 138 is supplied to the necessary portions of the signal processor 134. As an alternative, both the 78-M and 19-M clocks may be supplied to the signal processor 134, in which case a selector for selecting the clock appropriate to the currently set mode is placed at each of the necessary portions.

In this way, whether in the STS-12 mode or in the STS-48 mode, the data are supplied as 32 parallel signals to the signal processor 134 together with the clock that matches the data speed, so that most of the circuitry of the signal processor 134 can be shared between STS-12 and STS-48, as will be described below.

Figure 12:
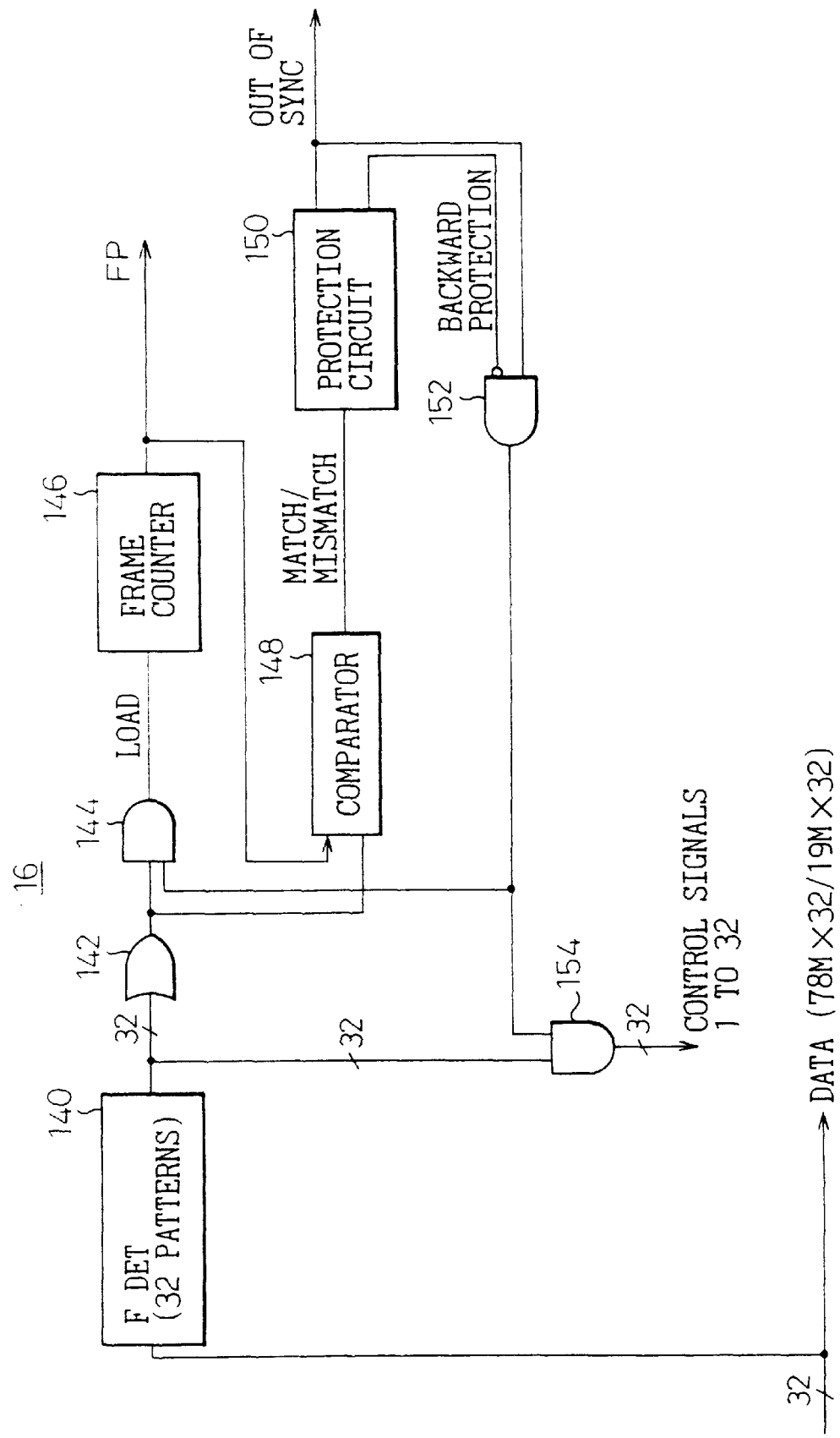
FIG. 12 is a circuit diagram showing the details of a synchronization circuit 116 shown in FIG. 11.

FIG. 12 shows a detailed configuration of the synchronization circuit 116 incorporated in the signal processor 134 of FIG. 11. In the case of the STS-12 signal, as previously noted, 12 A1 bytes appear consecutively, followed by 12 A2 bytes, which are used for frame synchronization. With the STS-48 signal, 48 A1 bytes appear consecutively, followed by 48 A2 bytes. Accordingly, if provisions are made to detect, for example, four bytes across the A1/A2 boundary, as in the case of STS-12/STS-3, it is possible to detect synchronization using a common circuit whether in the STS-48 mode or in the STS-12 mode. In this case, the consecutive four bytes, A1, A1, A2, and A2, can appear on the 32 signal lines in 32 different ways as shown by the first pattern in FIG. 13. The synchronization detector 140 of FIG. 12 therefore contains the 32 patterns shown in FIG. 13. In other respects, the configuration is the same as that of the STS-12/STS-3 case shown in FIG. 3, and therefore, a description thereof will be omitted.

Figure 14:
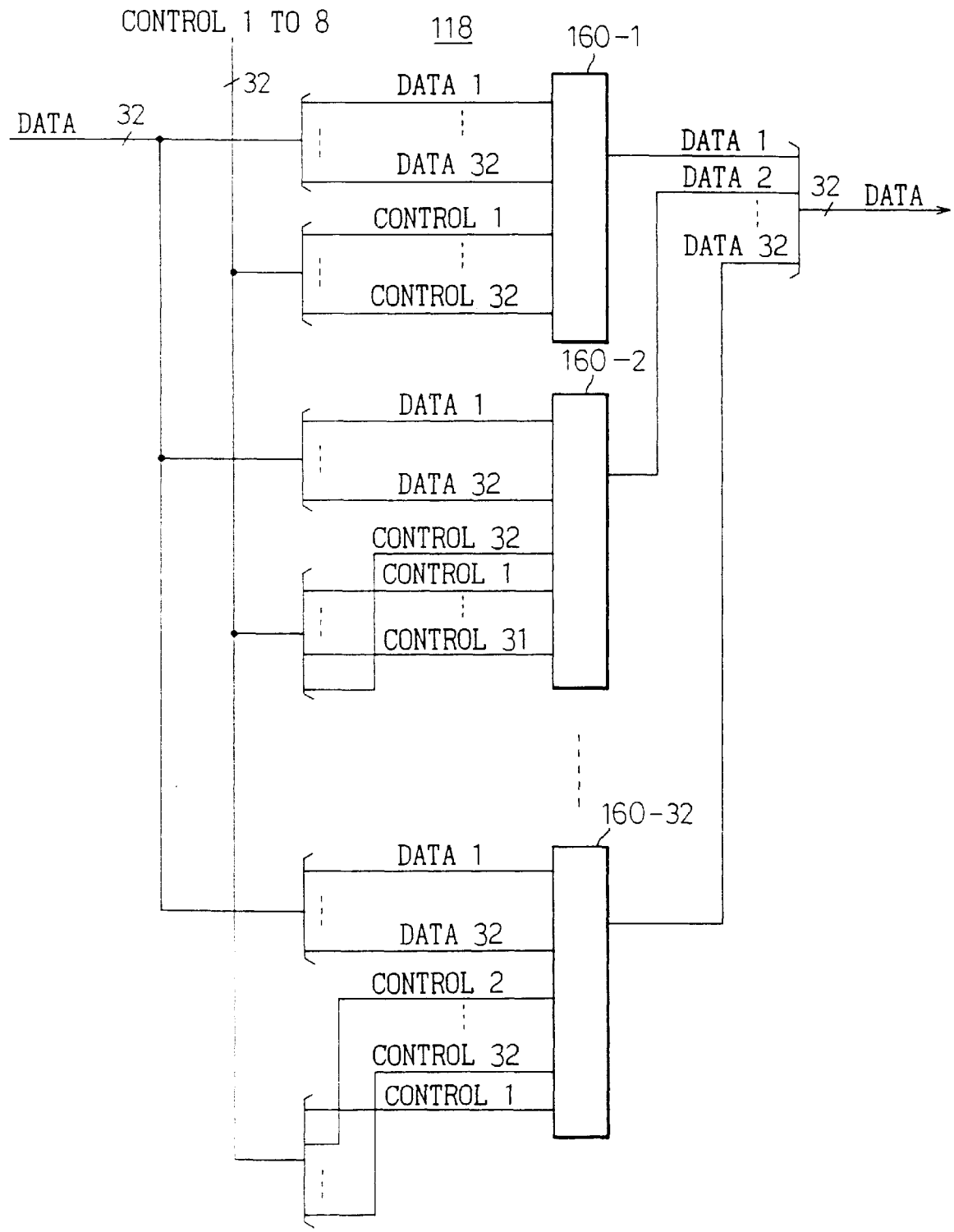
FIG. 14 is a circuit diagram showing the details of a byte switch 118 shown in FIG. 11.

FIG. 14 shows the details of the byte switch 118 of FIG. 11. The configuration is the same as that of the byte switch 18 shown in FIG. 8, except that the number of data lines and the number of control lines are 32; therefore, the description of the configuration will be omitted.

Figure 15:
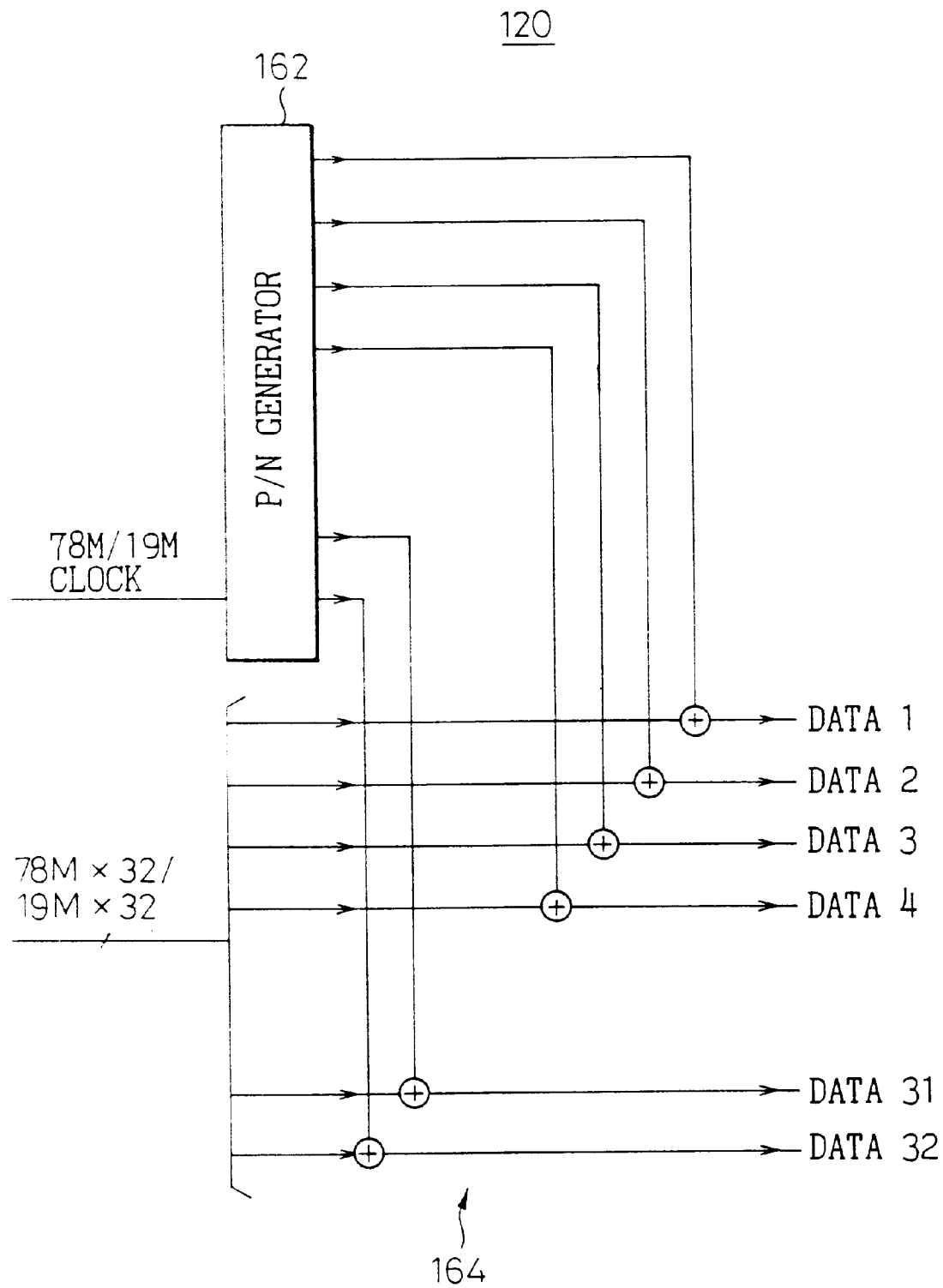
FIG. 15 is a circuit diagram showing the details of a descrambler 120 shown in FIG. 11.

FIG. 15 shows the details of the descrambler 120 of FIG. 11. The configuration is the same as that of the descrambler 20 shown in FIG. 8, except that the number of data lines is 32; therefore, the description of the configuration will be omitted. Here, the PN code generating polynomial is $1+x^6+x^7$.

Figure 16:
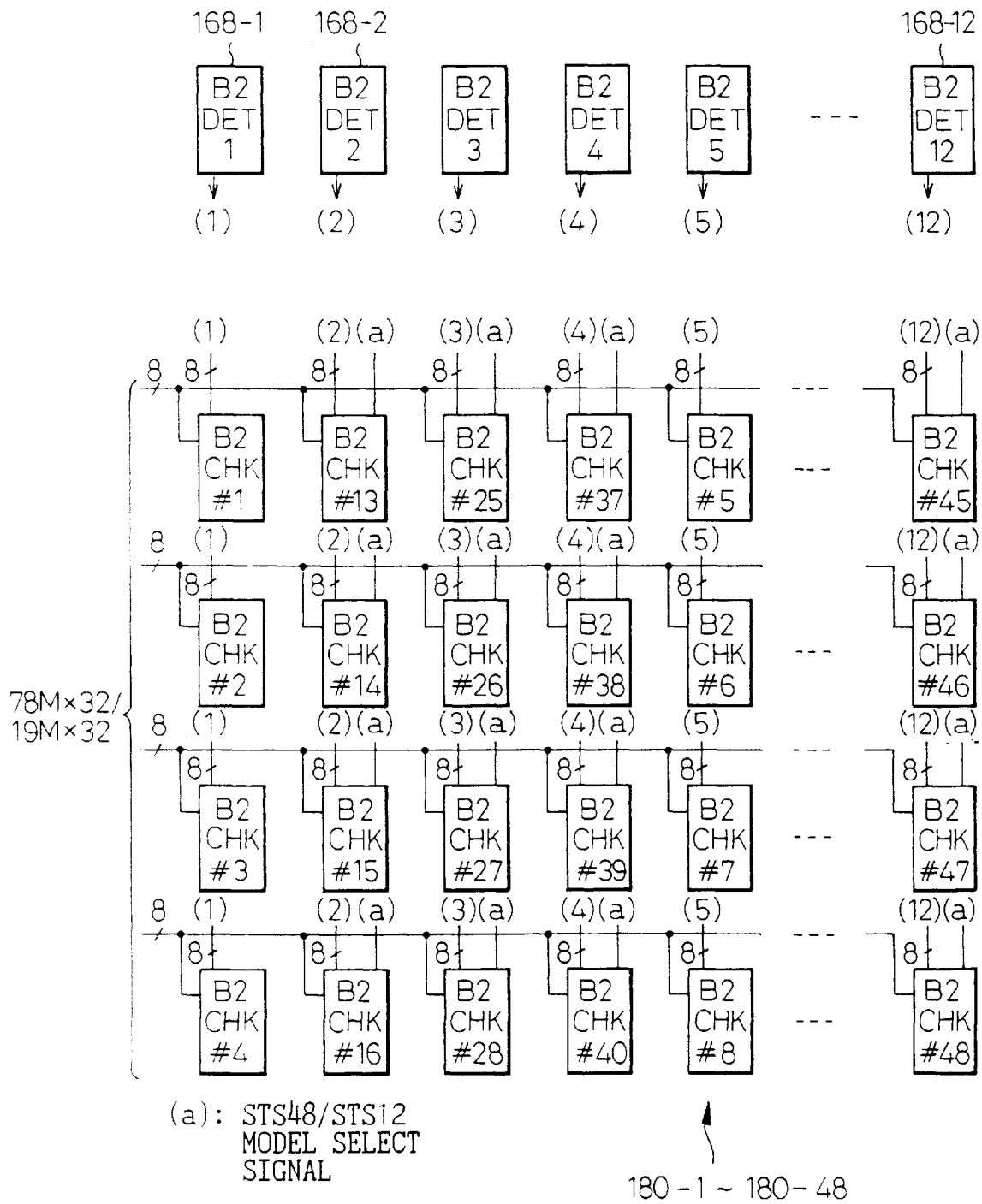
FIG. 16 is a block diagram showing the details of a Line BIP-8 check circuit 122 shown in FIG. 11.
Figure 17:
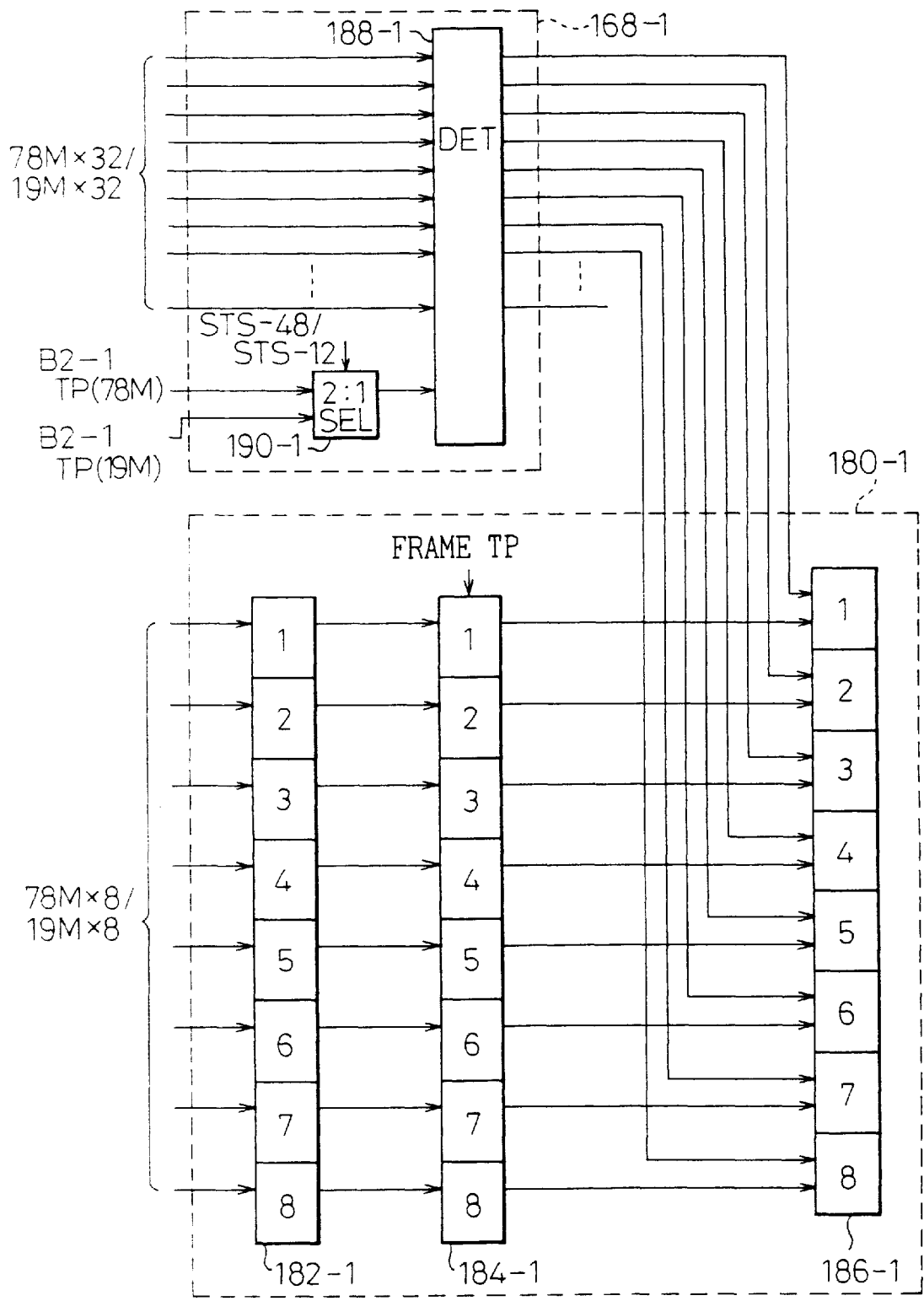
FIG. 17 is a circuit diagram showing in detail a B2 detector and a B2 checker shown in FIG. 16 and their interconnections.

FIGS. 16 and 17 show the details of the Line BIP-8 check circuit 122. FIG. 16 shows the general interconnection diagram of the circuit, and FIG. 17 shows in detail a B2 detector 168-1 selected from among the B2 detectors 168-1 to 168-12, a B2 checker 180-1 selected from among the B2 checkers 180-1 to 180-48, and their interconnections.

In FIG. 17, the B2 checker 180-1 includes a B2 counter 182-1 which calculates the parity, a latch circuit 184-1 which latches the result of the parity calculation, and a comparator circuit 186-1. The B2 detector 168-1 includes a selector 190-1 which selects a B2-1 timing pulse of 78-M width or a B2-1 timing pulse of 19-M width, depending on whether the mode is the STS-48 mode or STS-12 mode, and a detection circuit 188-1 which detects four B2 bytes from 32 parallel data streams based on the timing pulse selected by the selector 190-1. One of the four B2 bytes detected by the detection circuit 188-1 is supplied to the comparator circuit 186-1. The B2 counter 182-1 calculates the parity for the data between frame pulses, and the result is latched into the latch circuit 184-1. The comparator circuit 186-1 compares the result with the value of the B2 byte.

As shown in FIG. 16, in the STS-48 mode all the B2 checkers 180-1 to 180-48 are used, while in the STS-12 mode the outputs of 36 B2 checkers are inhibited by an STS-48/STS-12 mode select signal so that only 12 B2 checkers are used.

As described above, according to the present invention, most of the signal processing circuitry can be shared between different signal rates, such as the SONNET STS-2 and STS-12 or STS-12 and STS-48, so that a variety of signal rates can be accommodated using a single LSI. Compared to the case where dedicated circuits are provided to handle different signal rates, the mounting space of the LSI is small and power consumption is also small. Small power consumption also offers the advantage of alleviating thermal problems (it will be disadvantageous to apparatus maintenance if forced air cooling is employed when natural air cooling does not work because of temperature rise or when device characteristics degrade due to temperature rise by heating).

What is claimed is:

1. A signal processing apparatus to which first parallel received signals of a prescribed speed, or second parallel received signals whose speed is the same as the first received signal and whose number of signal lines are 1/n times that of the first received signals, are input, comprising:

a serial-to-parallel conversion circuit for converting the second received signals into parallel signals whose number of signal lines is the same as that of the first received signals and whose speed is 1/n times that of the first received signals;

a first selector for taking as inputs the first received signals and the outputs of the serial-to-parallel conversion circuit, and for selecting one or the other of the inputs;

a second selector for taking as inputs a first clock signal of the prescribed speed and a second clock signal whose speed is 1/n times the first clock signal, and for selecting the first clock signal when the first received signals are selected by the first selector, and the second clock signal when the outputs of the serial-to-parallel conversion circuit are selected by the first selector; and a signal processor for processing the parallel signals selected by the first selector, in synchronism with the clock signal selected by the second selector, wherein the multiple factor 1/n refers to the same fraction for each recitation and n is a positive integer.

2. An apparatus according to claim 1, wherein the signal processor includes a synchronization circuit that performs frame synchronization on the parallel signals selected by the first selector, in synchronism with the clock signal selected by the second selector, and thereby achieves frame synchronization, regardless of whether the first received signals or the second received signals are input to the signal processing apparatus.

3. An apparatus according to claim 2, wherein the signal processor further includes a byte switch circuit that rearranges the parallel signals selected by the first selector into correct signal positions in accordance with synchronization information output from the synchronization circuit, and thereby achieves a correct rearrangement of the signal positions of the parallel signals, regardless of whether the first received signals or the second received signals are input to the signal processing apparatus.

4. An apparatus according to claim 3, wherein the signal processor further includes a descrambling circuit that performs descrambling by applying a code, generated based on the clock signal selected by the second selector, to the parallel signals output from the byte switch circuit, and thereby achieves the descrambling, regardless of whether the first received signals or the second received signals are input to the signal processing apparatus.

5. An apparatus according to claim 4, wherein the signal processor further includes a parity check circuit that performs a parity check on the signal descrambled by the descrambling circuit.

* * * * *